(12) United States Patent
Deakin et al.

(10) Patent No.: US 8,931,103 B2
(45) Date of Patent: Jan. 6, 2015

(54) GENERATING SECURITY PERMISSIONS

(75) Inventors: Hannah Deakin, Southampton (GB);
Fenghui Jiang, Eastleigh (GB); John McNamara, Winchester (GB); Emlyn Whittick, Powys (GB)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 13/561,574

(22) Filed: Jul. 30, 2012

(65) Prior Publication Data

US 2013/0067532 A1    Mar. 14, 2013

(30) Foreign Application Priority Data

Sep. 8, 2011   (EP) .................................. 11180574

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 21/00* | (2013.01) | |
| *G06F 21/62* | (2013.01) | |
| *G06F 21/60* | (2013.01) | |

(52) U.S. Cl.
CPC ................ *G06F 21/00* (2013.01); *G06F 21/62* (2013.01); *G06F 21/60* (2013.01); *G06F 21/6218* (2013.01); *G06F 21/6227* (2013.01)
USPC ........ 726/25; 726/1; 726/4; 726/17; 717/124; 717/126; 717/136; 717/140; 717/141

(58) Field of Classification Search
CPC ......... G06F 21/00; G06F 21/60; G06F 21/62; G06F 21/6218; G06F 21/6227
USPC .............. 726/22–25; 717/124, 126–130, 136, 717/140, 141, 143
See application file for complete search history.

(56) References Cited

U.S. PATENT DOCUMENTS

| | | | |
|---|---|---|---|
| 6,708,276 B1 | 3/2004 | Yarsa et al. | |
| 7,076,804 B2 * | 7/2006 | Kershenbaum et al. | ........ 726/30 |
| 7,810,135 B2 | 10/2010 | Koved et al. | |
| 7,921,287 B2 * | 4/2011 | Sprigg et al. | .................. 713/165 |
| 8,230,477 B2 * | 7/2012 | Centonze et al. | ................. 726/1 |
| 8,286,239 B1 * | 10/2012 | Sutton | ............................ 726/22 |
| 8,332,939 B2 * | 12/2012 | Centonze et al. | .............. 726/22 |
| 8,661,419 B2 * | 2/2014 | Munzenberger et al. | ..... 717/135 |

(Continued)

OTHER PUBLICATIONS

PCT International Search Report and Written Opinion, International Appl. No. PCT/IB2012/054431, International Filing Date: Aug. 29, 2012, Date of Mailing: Feb. 7, 2013, 7 pages.

(Continued)

*Primary Examiner* — Jeffrey Pwu
*Assistant Examiner* — Jayesh Jhaveri
(74) *Attorney, Agent, or Firm* — Cantor Colburn LLP; Prentiss Johnson (57) ABSTRACT

Embodiments of the invention relate to generating security permissions for applications. A static analysis on an application is carried out to determine security exceptions and to determine the application components responsible for the security exceptions. The determined security exceptions are analyzed to calculate permissions required for each component. A security policy file that includes a hierarchy of the required permissions suitable for the type of application is formatted and applied to the application to provide a security enabled application.

17 Claims, 5 Drawing Sheets

(56) References Cited

U.S. PATENT DOCUMENTS

| | | | |
|---|---|---|---|
| 8,701,198 B2* | 4/2014 | Greene et al. | 726/25 |
| 2002/0184486 A1* | 12/2002 | Kershenbaum et al. | 713/150 |
| 2002/0199005 A1 | 12/2002 | Schneider et al. | |
| 2003/0084324 A1* | 5/2003 | Koved et al. | 713/200 |
| 2005/0262487 A1 | 11/2005 | Pistoia et al. | |
| 2006/0005019 A1 | 1/2006 | Chao | |
| 2006/0143594 A1* | 6/2006 | Grimaldi | 717/123 |
| 2006/0225124 A1* | 10/2006 | Kolawa et al. | 726/1 |
| 2008/0168527 A1 | 7/2008 | Koved et al. | |
| 2008/0201766 A1 | 8/2008 | Amirov et al. | |
| 2009/0007223 A1* | 1/2009 | Centonze et al. | 726/1 |
| 2009/0031402 A1 | 1/2009 | Jung et al. | |
| 2009/0094667 A1* | 4/2009 | Habeck et al. | 726/1 |
| 2010/0043048 A1* | 2/2010 | Dolby et al. | 726/1 |
| 2010/0180330 A1 | 7/2010 | Zhu et al. | |
| 2013/0198734 A1* | 8/2013 | Biswas et al. | 717/174 |

OTHER PUBLICATIONS

V. Benjamin Livshits et al.; "Finding Security Vulnerabilities JAVA Applications with Static Analysis"; Proceedings SSYM '05; Proceedings of the 14th Conference on USENIX Security Symposium—vol. 14; pp. 1-16.

Jeremy Briffaut et al.; "Generation of Role Based Access Control Security Policies for Java Collaborative Applications"; 2009 Third International Conference on Emerging Security Information Systems and Technologies (2009); pp. 224-229.

Gleb Naumovich et al. "Static Analysis of Role based Access Cotnrol in J2EE Applications"; Newsletter ACM SIGSOFT Software Engineering Notes Homepage Archive vol. 29, Issue 5, Sep. 2004; pp. 1-10.

Examination Report for Great Britain Application No. GB1405934. 9; Mailed May 7, 2014; 5 pages.

* cited by examiner

GENERATING SECURITY PERMISSIONS

PRIORITY

The present application claims priority to European Patent Application No. 11180574.3, filed on Sep. 8, 2011, and all the benefits accruing therefrom under 35 U.S.C. §119, the contents of which in its entirety are herein incorporated by reference.

BACKGROUND

This present invention relates generally to the field of security permissions for applications, and more specifically, to generating security permissions for applications in an enterprise environment.

Java 2 Security is a fine-grained, policy-based access control mechanism that is intended to increase overall system integrity by guarding access to protected system resources. (Java and ail Java-based trademarks and logo are trademarks or registered trademarks of Oracle and/or its affiliates.)

A typical scenario that occurs when Java 2 Security is enabled is that applications will stop working due to security access exceptions. The system administrator has to set up a coherent security policy, and this requires experience and security expertise on the part of the system administrator. An alternative option is to allow users to handle the policy management, which may result in mistakes being made due to their lack of expertise in defining security policies.

In many cases, in order to get applications working quickly, applications are given the permission "AllPermission" which is all encompassing and essentially negates the value that Java 2 Security is intended to provide.

Once the application is working, the tendency is not to go back to define proper security settings. System users may have a misplaced sense of security and assume that they have security protection as they know that Java 2 Security is enabled on the server.

Users that attempt to define the correct policy for their files may encounter difficulties. Often it is recommended that the application code be executed and that each time a security exception is hit, the security exception is analysed. Examples of options that may be taken when a security exception is encountered include: put the code in a "doPrivileged" block if the code is trusted (a drawback to this option is that this will open security holes); add the exception to the security policy file; and recode the application if the application should not actually be using that code.

The decision of which option to take requires a good understanding of security and of the application code. Once users have decided which option to take, they rerun the application again and potentially hit the next security exception and repeat the process until the application runs cleanly. Even once the application has run cleanly there is no guarantee that all the code paths which might generate a security exception will have been exercised, so it may just be a matter of time before the user hits the next one.

Adding to the difficulty of defining a security policy is that enterprise applications are often made up of multiple components. In the case of Java Enterprise Edition (EE) Enterprise Archive (EAR) files, the components might include, for example, Java Archive (JAR) files or Web application Archive (WAR) files contained in a hierarchy. Similarly, for OSGi Enterprise Bundle Archive (EBA) enterprise applications, the components might consist of different bundles in a hierarchy. (OSGi is a trademark or a registered trademark of the OSGi Alliance in the United States, other countries, or both.) Java 2 Security can be defined hierarchically to allow policies to be fine-tuned to the separate components. To add to the complication, the way these are defined for the different enterprise applications is different as well. In addition, the format of these policies is extremely sensitive to incorrect formatting, and they are of slightly different formats for each type of enterprise application.

SUMMARY

Embodiments include a method, system, and computer program product for generating security permissions for applications. A static analysis on an application is carried out to determine security exceptions and to determine the application components responsible for the security exceptions. The determined security exceptions are analysed to calculate permissions required for each component. A security policy file that includes a hierarchy of the required permissions suitable for the type of application is formatted and applied to the application to provide a security enabled application.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are described in which a tool is provided which a user may run once, which calculates the possible security exceptions in an application and the components they correspond to. The user may then confirm if all of these exceptions are valid, so that the tool proceeds and produces required security policy files in the correct format. Furthermore, the required security policy files are calculated correctly to match the application hierarchy, which enables their application for Java 2 Security.

The described method and system takes an application and, through static analysis of the application components, produces the set of required Java 2 Security permissions that the application requires in order to run.

There are two stages to the described process.

First, a permission analysing stage takes an existing application which may be in an enterprise environment (for example, an OSGi or Java EE), and performs a static analysis of the code to calculate what security access exceptions might be generated by the code, and which components of the application would be generating those security access exceptions. Analysis of the results then calculates what permissions should be allocated to each component.

Second, a permission formatting stage takes as input the original application and the output from the permission analysis to produce a final application with the correct Java 2 Security permission or policy files. This stage determines the type of application and from there it determines the correct structure of the file(s) and determines the correct way to represent the hierarchy of permissions. In JEE this may be one high-level file, with corresponding entries for the component codebases. For OSGi, it may be one high-level application level permission file, as well as component level permission files packaged up inside the bundles themselves.

The use of static analysis techniques generates secured applications, with only minimal validation required by a system administrator before deployment, whereby the permission structure also correctly reflects the code hierarchy of the application components.

Figure 1:
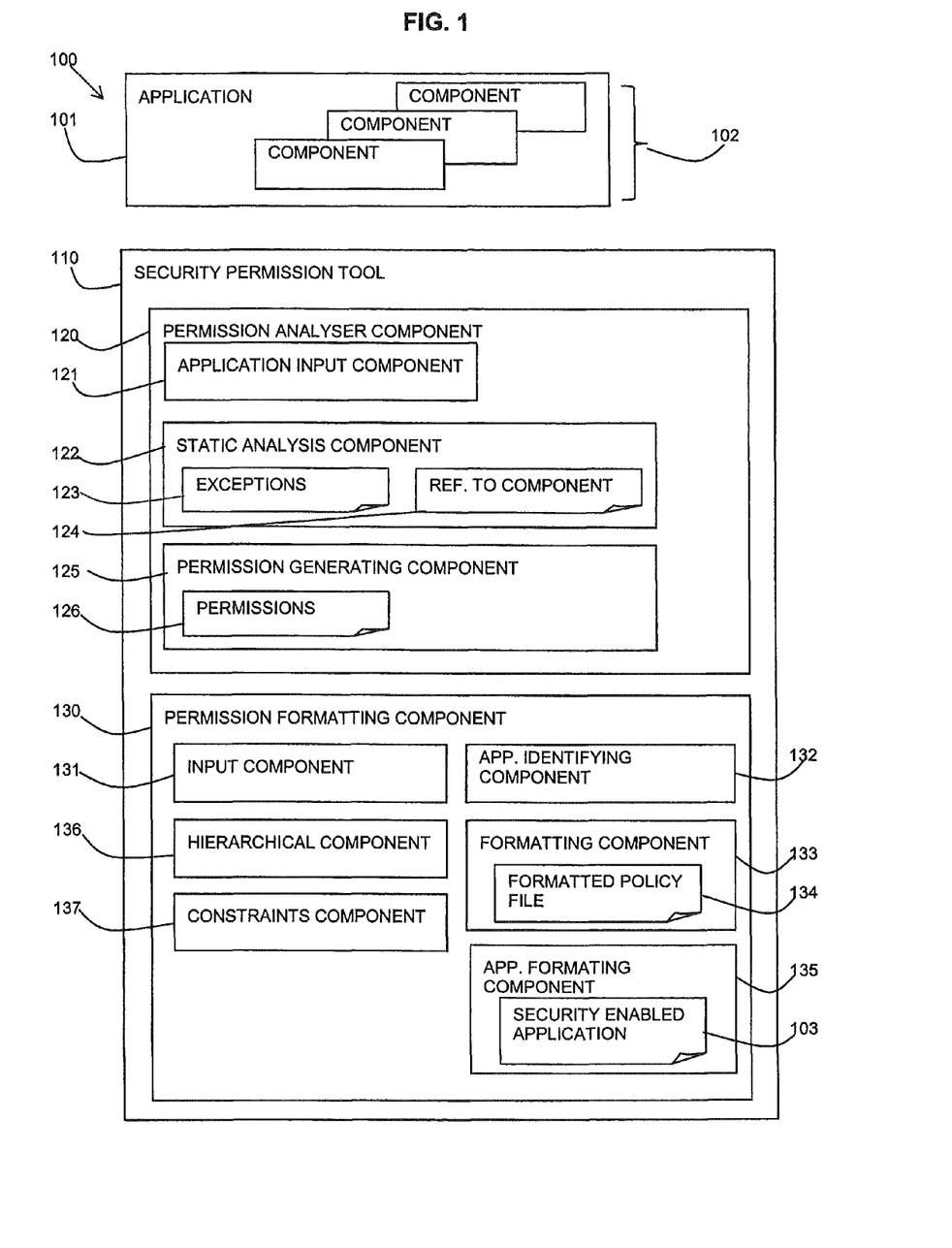
FIG. 1 is a block diagram of a system in accordance with an embodiment of the present invention.

Referring to FIG. 1, a block diagram shows an embodiment of the system 100 in accordance with an embodiment. A security permission tool 110 is provided for generating and applying security permissions to an application 101.

The security permission tool 110 shown in FIG. 1 includes two main components providing two stages. A first component is a permission analyser component 120. The second component is a permission formatting component 130.

The permission analyser component 120 shown in FIG. 1 also includes an application input component 121 for receiving an application 101 to be analysed. In an embodiment, a static analysis component 122 is provided for performing static analysis of the code of the application 101. The static analysis component 122 outputs security access exceptions 123 which are mapped to references 124 of components 102 of the application 101 generating the exceptions 123. A permission generating component 125 is provided for calculating the permissions 126 which should be allocated to each component 102 of the application 101.

The permission formatting component 130 shown in FIG. 1 includes an input component 131 for receiving the application 101 and the permissions 126 generated by the permission analyser component 120. In an embodiment, the permissions 126 map to the references 124 of components 102 of the application 101.

The permission formatting component 130 shown in FIG. 1 also includes an application identifying component 132 for determining the type and structure and hierarchy of the application 101. A hierarchical component 136 is provided for generating a hierarchical tree based on the structure of the application and permissions required.

In the embodiment shown in FIG. 1, a formatting component 133 formats the permissions 126 in a correct form of security policy for the type of application including hierarchy of the permissions 126 to generate a formatted policy file 134.

As shown in FIG. 1, a constraints component 137 may also be provided with given policy constraints for an application to be compared against generated security policies.

As shown in the embodiment in FIG. 1, an application formatting component 135 is provided for applying the formatted policy file 134 to the application 101 to produce a security enabled application 103. The permission formatting component 130 outputs the security enabled application 103 including the correctly formatted permissions and security policies applied to the application components 102.

There are known tools that can detect potential areas of code that would generate a security exception. For example, FindBugs (FindBugs is a trade mark of University of Maryland) is an open source example of a tool which may be run as part of a build process to statically analyse code. The standard use of this is to warn developers of areas which might potentially need to be encapsulated in a doPriviledged block. Embodiments described herein make use of such existing static analysis methods to calculate all the possible security exceptions that the application code could generate, and therefore the corresponding maximal set of permissions needed.

As well as storing the permissions, the system may also keep a mapping of which component required the permissions.

By performing set calculations, it is possible to determine which permissions can be extracted out to a higher level, and which would only be needed by particular components. In this way, the permission structure generated will still be kept as closely tied to the component hierarchy as possible. The benefit of this is that it avoids the situation where permissions are granted at the application level unnecessarily making the system less secure when only a small component of the application needs to be granted that permission.

Figure 2:
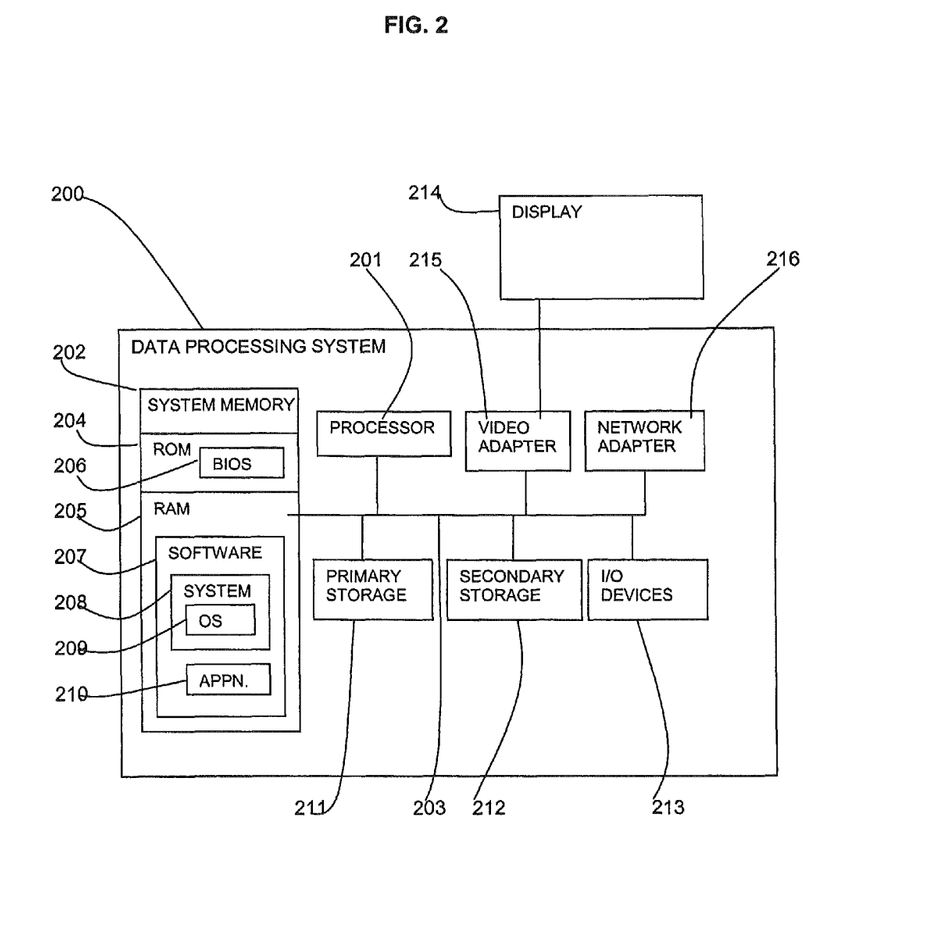
FIG. 2 is a block diagram of a computer system in which an embodiment of the present invention may be implemented.

Referring to FIG. 2, an exemplary system for implementing aspects of embodiments of the invention includes a data processing system 200 suitable for storing and/or executing program code including at least one processor 201 coupled directly or indirectly to memory elements through a system bus 203. The memory elements may include local memory employed during actual execution of the program code, bulk storage, and cache memories which provide temporary storage of at least some program code in order to reduce the number of times code must be retrieved from bulk storage during execution.

In the embodiment in FIG. 2, the memory elements include system memory 202 in the form of read only memory (ROM) 204 and random access memory (RAM) 205. A basic input/output system (BIOS) 206 may be stored in ROM 204. System software 207 may be stored in RAM 205 including operating system software 208 including operating system (OS) 209. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
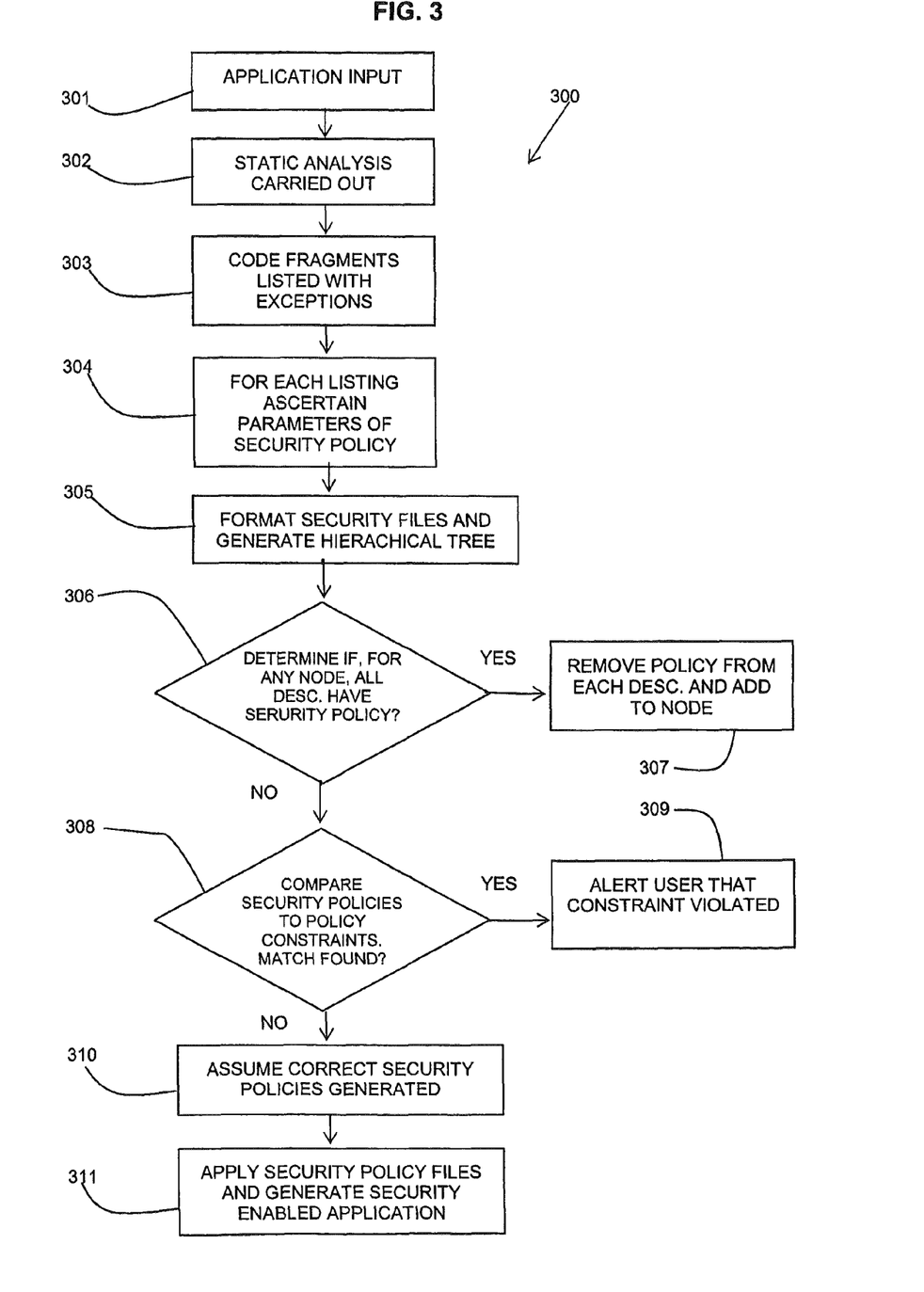
FIG. 3 is a flow diagram of an embodiment of a method in accordance with an embodiment of the present invention.

Referring to FIG. 3, a flow diagram 300 of a method that may be implemented by an embodiment is generally shown. This diagram shows the flow of how an application becomes a Java 2 Security ready application in accordance with an embodiment.

An application is input at block 301 into the system. A static analysis is carried out at block 302 on the application to analyze code for potential security exceptions. The code fragments are listed at block 303 with their associated security exceptions. For each code fragment in the listing, the code fragment is analyzed at block 304 to ascertain the required parameters for the security policy and to calculate permissions required. For example, for a code fragment that writes to disk that requires a FilePermission, it is ascertained that it is a "write" call and the associated file is written to from the method signature.

Security policy files are formatted and a hierarchical tree is generated at block 305 based on the code's class structure (inheritance, etc.) with each node being the associated security policy for that particular component/class.

The security policies are aggregated by determining, at block 306, if for any node, all its descendants have a given specific security policy. If so, at block 307, this policy is removed from each descendant and added it to the node's security policy.

The generated security policies are compared at block 308 to the given policy constraints provided to the generating application. If none match, then it is assumed appropriate and correct security policy definitions have been generated and processing continues at block 310. If a match is found, then a user is alerted at block 309 and the violating security policy is removed from the generated security policy definition.

At block 311, based on the security policy definitions generated, the appropriate security policy files are generated and the security policy files are then applied in the format of the determined hierarchy for the application and a security enabled application is generated 311.

Using the above method, when generating the security policy for a given piece of code, the policy generation application described has the ability to be able to specify constraints. A default set of policy constraints may be specified for the policy generation such that if a generated policy violates any of these constraints, it would flag the user, otherwise it would assume that all is correct.

For example, a constraint may be that no application can write to the root directory of a file system. By specifying this constraint, if a policy is targeted to be generated that allows write permission to a root directory then this would be flagged to the user and not included in any generated security policy file.

Figure 4A:
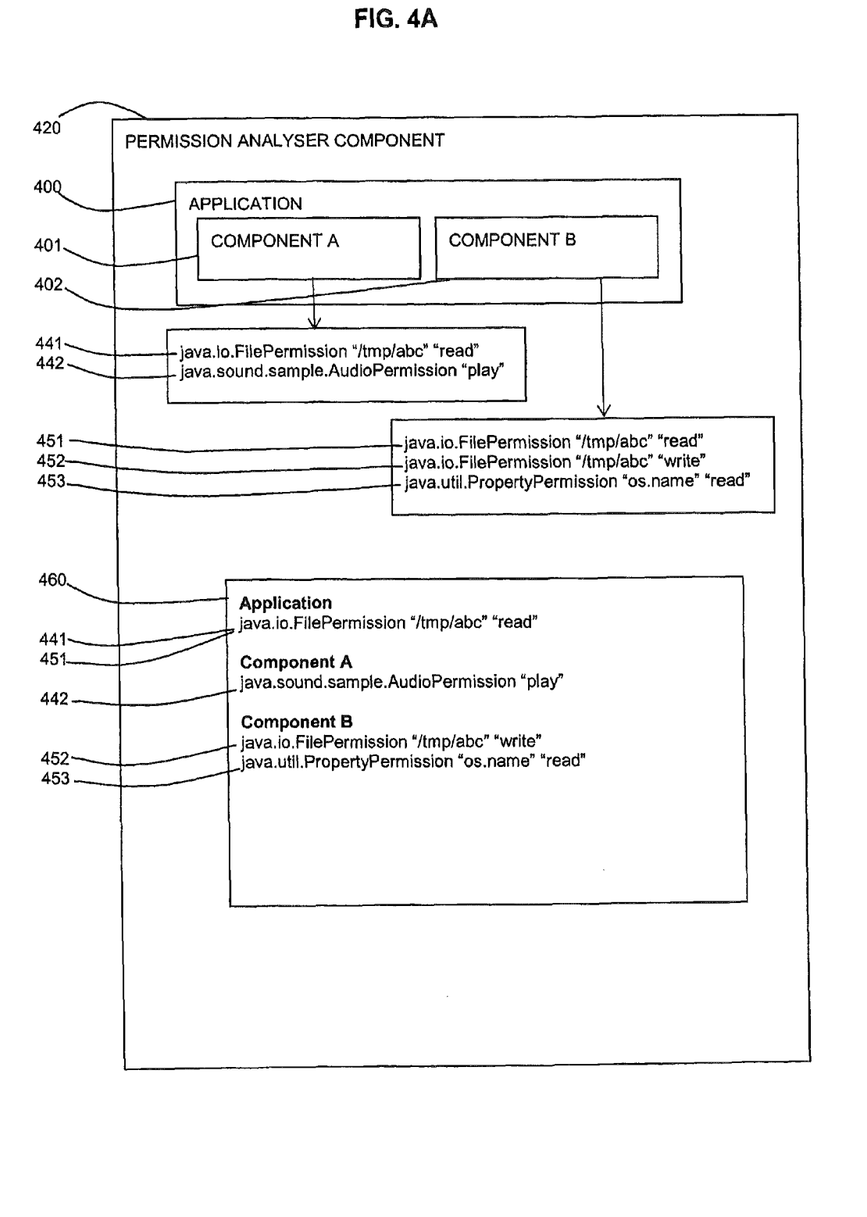
FIGS. 4A and 4B show an example of a first stage and a second stage of a method in accordance with an embodiment of the present invention.
Figure 4B:
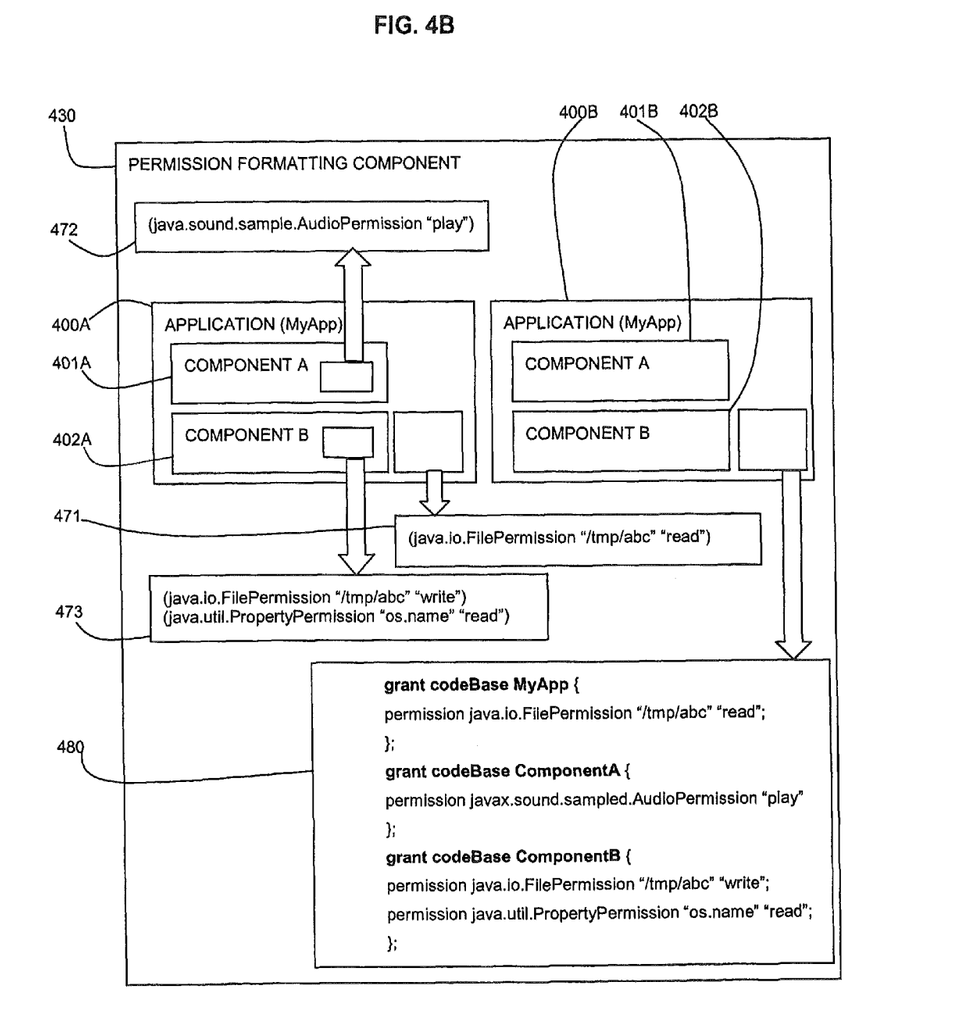

Referring to FIGS. 4A and 4B, an example embodiment is illustrated.

FIG. 4A walks through an example of a first stage of analyzing permissions in accordance with an embodiment. An enterprise application is analysed to calculate the full set of permissions that might be needed by the application at runtime.

An application 400 includes a first component A 401 and a second component B 402. A permission analyser component 420 analyses the application 400. It is determined that two permissions 441, 442 are required by the first component A 401 and three permissions 451, 452, 453 are required by the second component B 402. It is noted that permission 441 and permission 451 are the same permission that is needed by both component A 401 and component B 402. This permission 441, 451 is pulled up to the application level of a permission hierarchy 460. The rest of the permissions are kept linked to the particular components they have been generated from.

FIG. 4B illustrates the second phase of the process where the calculated permissions from FIG. 4A are used to produce and package the final security enabled application, according to the requirements of the type of application.

In FIG. 4B, two types of application are handled by a permission formatting component 430. The type of application will determine the permission file structure within the application, naming of the files and also syntax of the permissions within the file.

A first application 400A is shown as an example OSGi enterprise application. Three permission policy files 471, 472, 473 are generated for the OSGi enterprise application for each of the first application 400A, component A 401A and component B 402A.

A second application 400B is shown in the form of an example Java enterprise application with component A 401B and component B 402B. For this form of application a single permission policy file 480 may be generated with the component hierarchy specified within that file.

In this form of second application 400B, the component hierarchy may be specified as:

```
grant codeBase MyApp {
permission java.io.FilePermission "/tmp/abc" "read";
};
grant codeBase ComponentA {
permission javax.sound.sampled.AudioPermission "play"
};
grant codeBase ComponentB {
permission java.io.FilePermission "/tmp/abc" "write";
permission java.util.PropertyPermission "os.name" "read";
};
```

The described method and system address the problem of an incorrectly configured or a non-existent security policy for executing an application. Embodiments of the invention involve static analysis of an application to determine security exposures and to formulate an appropriate security policy for proposal to a system user/administrator. In this way, secure applications can be prepared for execution without undue burden on system administrators who may know nothing of either or both of enterprise security or the particular application.

A system for generating security permission for an application may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A computer-implemented method for generating security permissions for computer applications, the method comprising:
   carrying out static analysis on the source code of an application to determine security exceptions and to determine components of the source code of the application responsible for the security exceptions;
   analysing the determined security exceptions to calculate permissions required for each of the components during execution of the application;
   formatting a security policy file to include a hierarchy of required permissions based on the calculated permissions, the required permissions of the hierarchy of required permissions each being required by at least one of a node and a plurality of descendants of the node, the formatting based on a type of the application, wherein formatting the security policy file comprises:
      determining that each of the plurality of descendants of the node requires a first particular permission that is the same for each of the plurality of descendants;
      pulling up the first particular permission from a level of each of the plurality of descendants to a level of the node in the hierarchy of required permissions based on determining that each of the plurality of descendants requires the first particular permission; and
      based on only a single descendent of the plurality of descendants requiring a second particular permission, leaving the second particular permission linked only to the single descendant in the hierarchy of permissions; and
   applying the security policy file comprising the hierarchy of required permissions to the application during execution of the application to provide a security enabled application.

2. The method as claimed in claim 1, wherein carrying out static analysis includes:
   listing code fragments of the application program with associated security exceptions; and
   generating, for each code fragment, the required parameters for the security policy file.

3. The method as claimed in claim 1, wherein
   the hierarchical tree comprises a class structure of the application, with each node being an associated security policy for a class or component.

4. The method as claimed in claim 1, further comprising:
   comparing a generated security policy in the security policy file with given policy constraints provided for the application; and
   providing an alert if a policy constraint is violated.

5. The method as claimed in claim 1, wherein formatting a security policy file includes:
   providing a high level security policy file with entries for component codebases.

6. The method as claimed in claim 1, wherein formatting a security policy file includes:
   providing an application level security policy file comprising the first particular permission; and
   providing a component level security policy file comprising the second particular permission.

7. A system for generating security permissions for computer applications, the system comprising:
   a processor;
   a permission analyser component for:
      carrying out static analysis on the source code of an application to determine security exceptions and to determine components of the source code of the application responsible for the security exceptions; and
      analysing the determined security exceptions to calculate permissions required for each of the components during execution of the application; and
   a permission formatting component for formatting a security policy file to include a hierarchy of required permissions based on the calculated permissions, the required permissions of the hierarchy of required permissions each being required by at least one of a node and a plurality of descendants of the node, the formatting based on a type of the application, wherein formatting the security policy file comprises:
      determining that each of the plurality of descendants of the node requires a first particular permission that is the same for each of the plurality of descendants;
      pulling up the first particular permission from a level of each of the plurality of descendants to a level of the node in the hierarchy of required permissions based on determining that each of the plurality of descendants requires the first particular permission; and
      based on only a single descendent of the plurality of descendants requiring a second particular permission, leaving the second particular permission linked only to the single descendant in the hierarchy of permissions;
   wherein the security policy file comprising the hierarchy of required permissions is applied to the application during execution of the application to provide a security enabled application.

8. The system as claimed in claim 7, wherein the hierarchical tree comprises a class structure of the application, with each node being an associated security policy for a class or component.

9. The system as claimed in claim 7, wherein the permission formatting component includes a constraints component for comparing a generated security policy in the security policy file with given policy constraints provided for the application, and for providing an alert if a policy constraint is violated.

10. The system as claimed in claim 7, wherein a security policy file includes a high level security policy file with entries for component codebases.

11. The system as claimed in claim 7, wherein a security policy file includes an application level security policy file comprising the first particular permission, and a component level security policy file comprising the second particular permission.

12. A computer program product for generating security permissions for computer applications, the computer program product comprising:

a non-transitory computer readable storage medium having computer readable program code embodied therewith, the computer readable program code comprising:
computer readable program code configured to for:
- carrying out static analysis on the source code of an application to determine security exceptions and to determine components of the source code of the application responsible for the security exceptions;
- analysing the determined security exceptions to calculate permissions required for each of the components during execution of the application;
- formatting a security policy file to include a hierarchy of required permissions based on the calculated permissions, the required permissions of the hierarchy of required permissions each being required by at least one of a node and a plurality of descendants of the node, the formatting based on a type of the application, wherein formatting the security policy file comprises:
  - determining that each of the plurality of descendants of the node requires a first particular permission that is the same for each of the plurality of descendants;
  - pulling up the first particular permission from a level of each of the plurality of descendants to a level of the node in the hierarchy of required permissions based on determining that each of the plurality of descendants requires the first particular permission; and
  - based on only a single descendent of the plurality of descendants requiring a second permission, leaving the second permission linked only to the single descendant in the hierarchy of permissions; and
- applying the security policy file comprising the hierarchy of required permissions to the application during execution of the application to provide a security enabled application.

13. The computer program product as claimed in claim 12, wherein carrying out static analysis includes:
- listing code fragments of the application with associated security exceptions; and
- generating, for each code fragment, required parameters for the security policy file.

14. The computer program product as claimed in claim 12, wherein
- the hierarchical tree comprises a class structure of the application, with each node being an associated security policy for a class or component.

15. The computer program product as claimed in claim 12, wherein the computer readable program code is further configured for:
- comparing a generated security policy in the security policy file with given policy constraints provided for the application; and
- providing an alert if a policy constraint is violated.

16. The computer program product as claimed in claim 12, wherein formatting a security policy file includes:
- providing a high level security policy file with entries for component codebases.

17. The computer program product as claimed in claim 12, wherein formatting a security policy file includes:
- providing an application level security policy file comprising the first particular permission; and
- providing a component level security policy file comprising the second particular permission.

* * * * *